United States Patent [19]
Czerwiec et al.

[11] Patent Number: 5,687,014
[45] Date of Patent: *Nov. 11, 1997

[54] OPTICAL DISTRIBUTION SHELF FOR A REMOTE TERMINAL OF AN OPTICAL FIBER TELECOMMUNICATIONS NETWORK

[75] Inventors: Richard M. Czerwiec; Joseph E. Sutherland, both of Raleigh; Marlin V. Simmering, Wendell; Andrew L. Withers; Robert S. Kroninger, both of Raleigh, all of N.C.

[73] Assignee: Alcatel Network Systems, Inc., Richardson, Tex.

[ * ] Notice: The term of this patent shall not extend beyond the expiration date of Pat. No. 5,576,874.

[21] Appl. No.: 682,915

[22] Filed: Jul. 16, 1996

Related U.S. Application Data

[62] Division of Ser. No. 738,315, Jul. 31, 1991, Pat. No. 5,576,874.

[51] Int. Cl.$^6$ ...................................... H04Q 14/00
[52] U.S. Cl. ........................ 359/123; 359/110; 359/125; 359/137
[58] Field of Search ........................... 359/118, 123, 359/124, 125, 132, 135, 152, 158, 115; 370/71, 121, 478, 480, 498

[56] References Cited

U.S. PATENT DOCUMENTS

| | | | |
|---|---|---|---|
| 4,441,180 | 4/1984 | Schüssler | 370/3 |
| 4,545,048 | 10/1985 | Hauk et al. | 370/1 |
| 4,686,667 | 8/1987 | Ohnsorge | 370/4 |
| 4,704,715 | 11/1987 | Shibagaki et al. | 370/50 |
| 4,709,418 | 11/1987 | Fox et al. | 455/612 |
| 4,723,237 | 2/1988 | Andrew et al. | 370/11 |
| 4,817,204 | 3/1989 | Jannelli et al. | 455/607 |
| 4,935,918 | 6/1990 | Hicks | 370/4 |
| 5,005,166 | 4/1991 | Suzuki et al. | 370/1 |
| 5,029,333 | 7/1991 | Graves et al. | 370/58.1 |
| 5,400,163 | 3/1995 | Mizuochi et al. | 359/124 |
| 5,576,874 | 11/1996 | Czerwiec et al. | 359/123 |

FOREIGN PATENT DOCUMENTS

| | | | |
|---|---|---|---|
| 0386482 | 9/1990 | European Pat. Off. | H04Q 11/00 |

*Primary Examiner*—Wellington Chin
*Assistant Examiner*—Rafael Bacares
*Attorney, Agent, or Firm*—Ware, Fressola, Van Der Sluys & Adolphson LLP

[57] ABSTRACT

In an optical fiber telecommunications network for providing both narrowband telephony signals and broadband video services over a single optical fiber using a single optical carrier, an optical distribution shelf includes a plurality of optical distribution units and interface units for interfacing with a controlling microprocessor. The optical distribution units receive baseband TDM telephony signals in serial format and the broadband video signals and function to frequency division multiplex the broadband video signals with the baseband telephony signals. The multiplexed signal is used to frequency modulate an optical carrier for transmission on a single optical fiber.

2 Claims, 12 Drawing Sheets

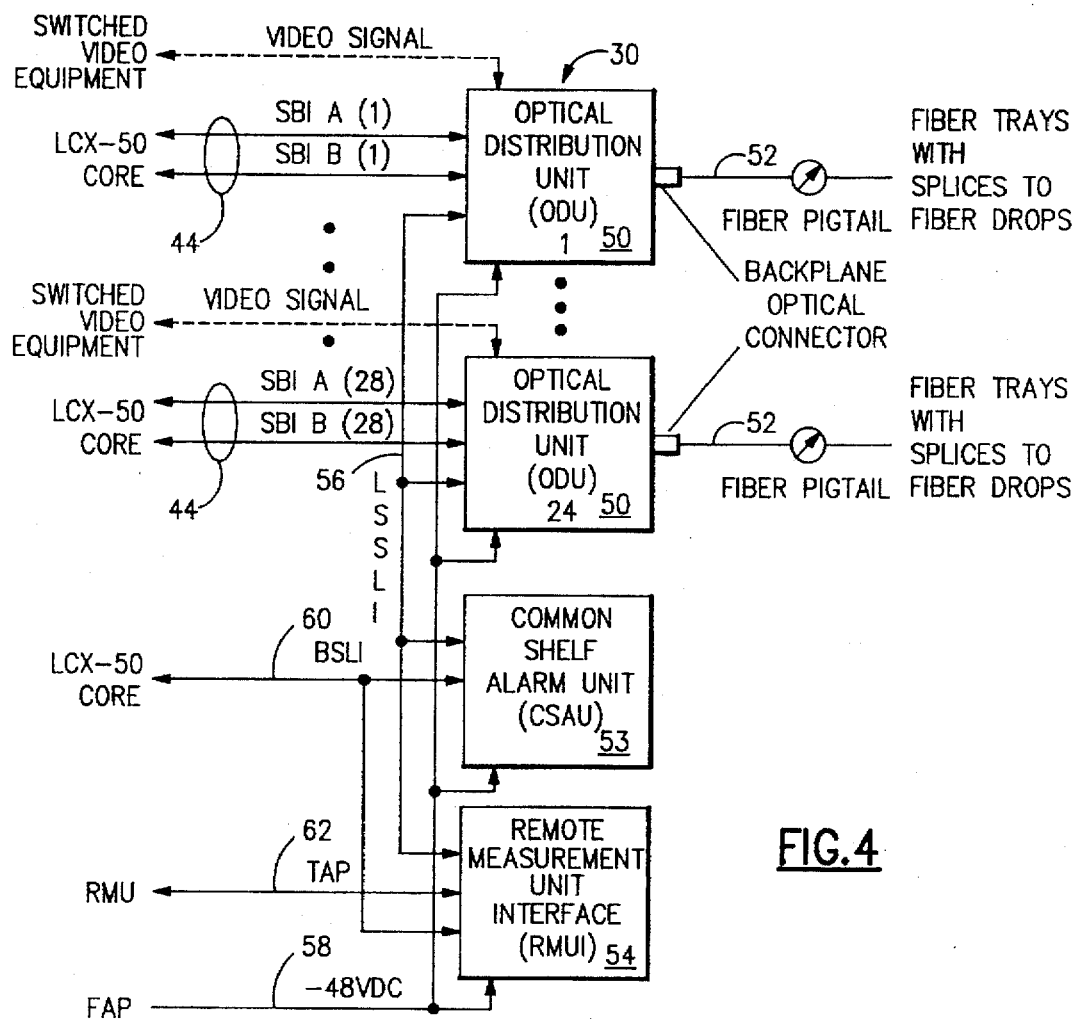
FIG.4
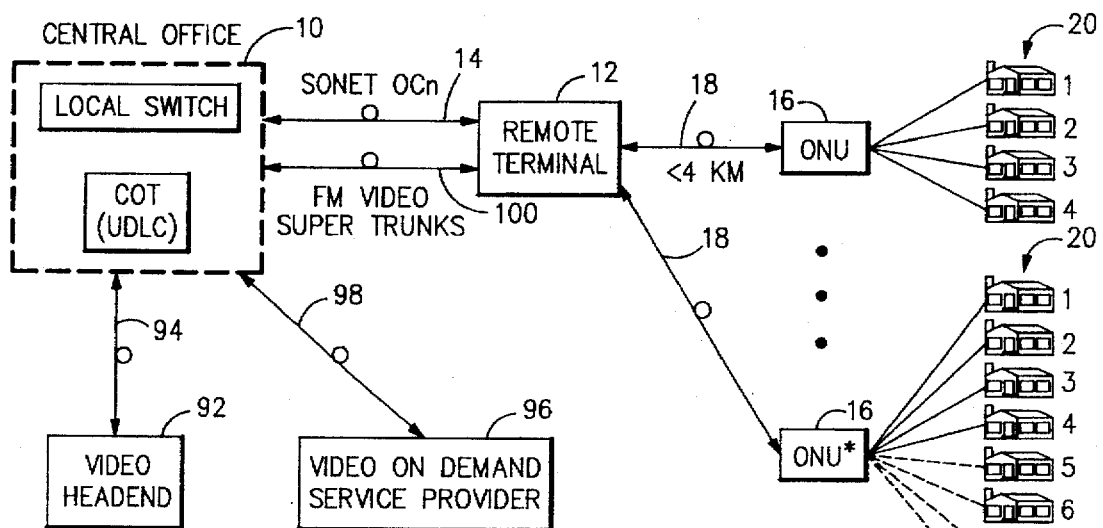
FIG.7  *BROADBAND SERVICES TO MORE THAN 4 LIVING UNITS FROM AN ONU REQUIRE SECOND FIBER

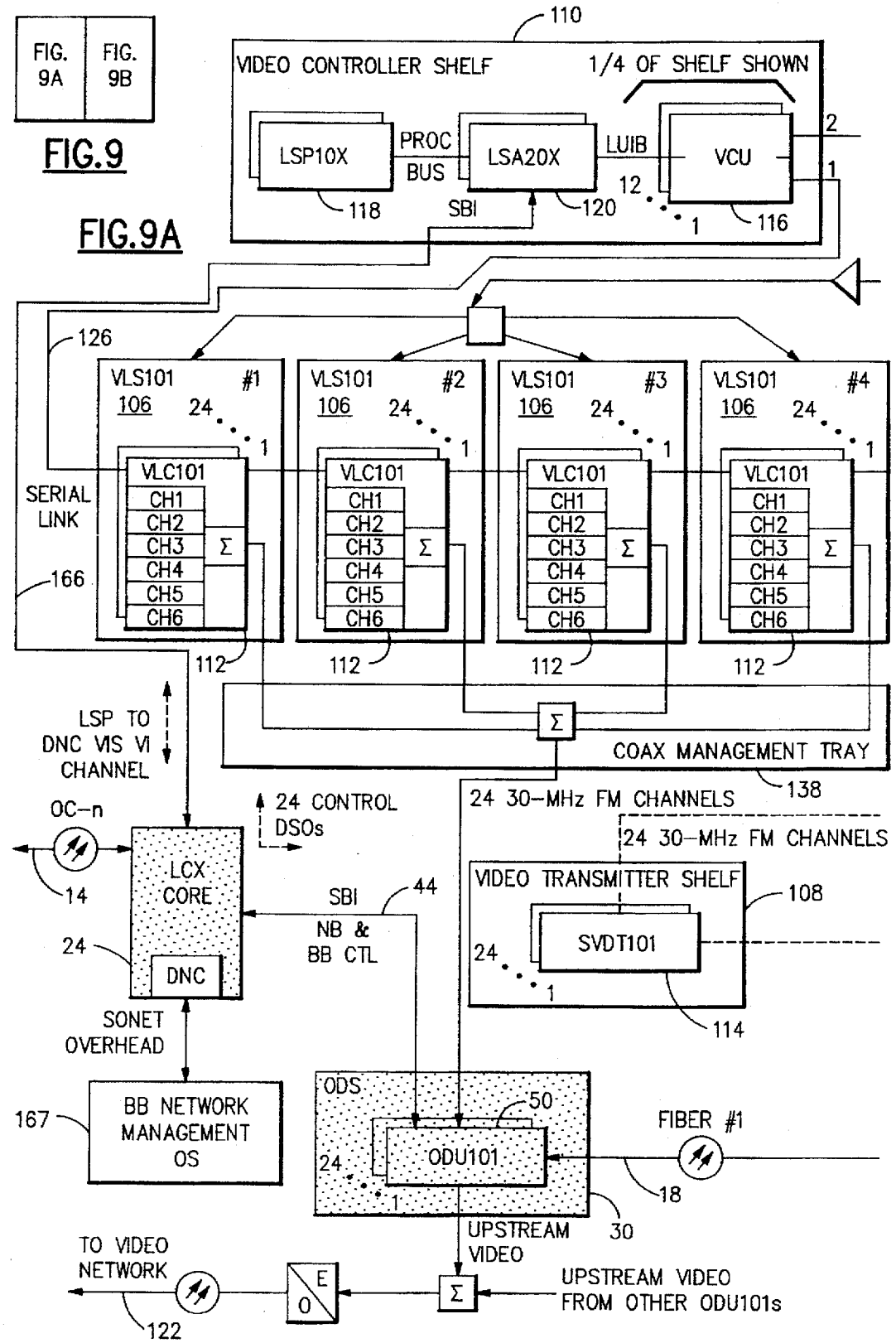

FIG. 9B
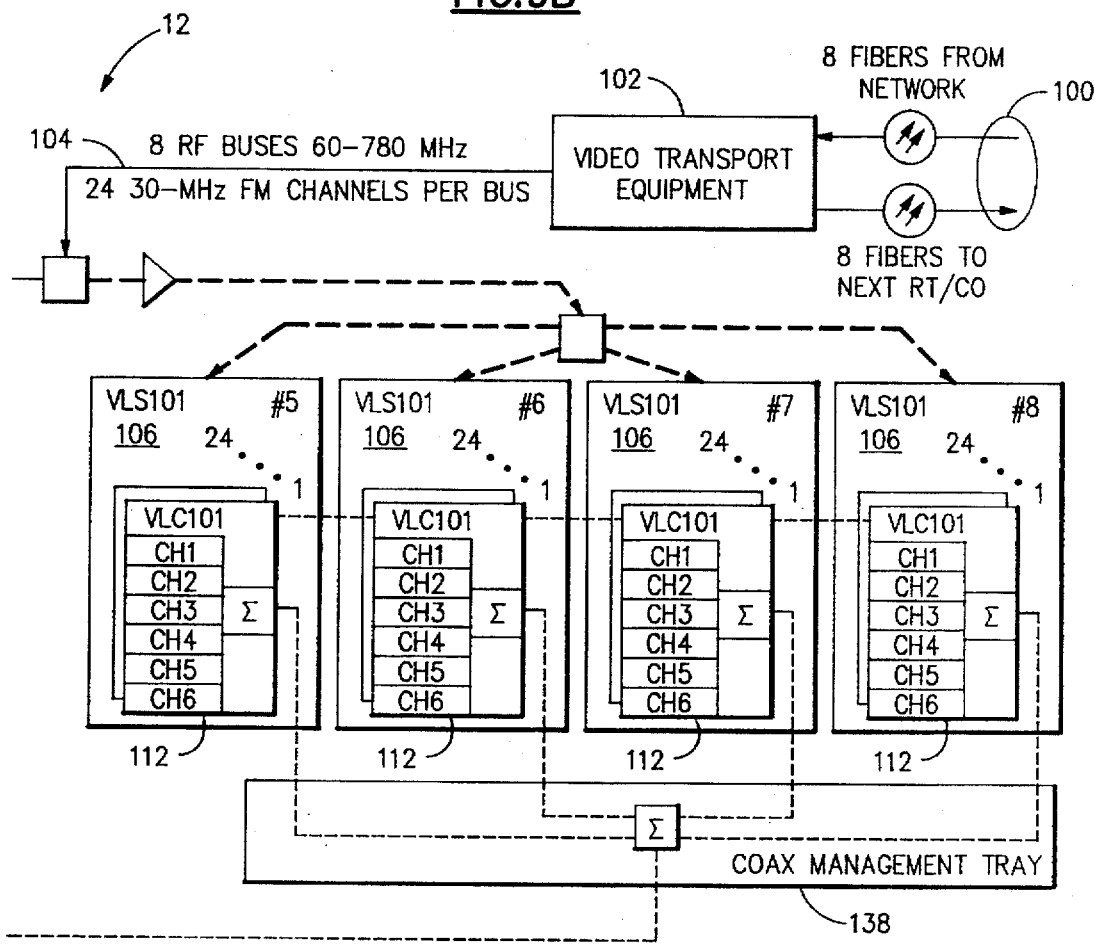
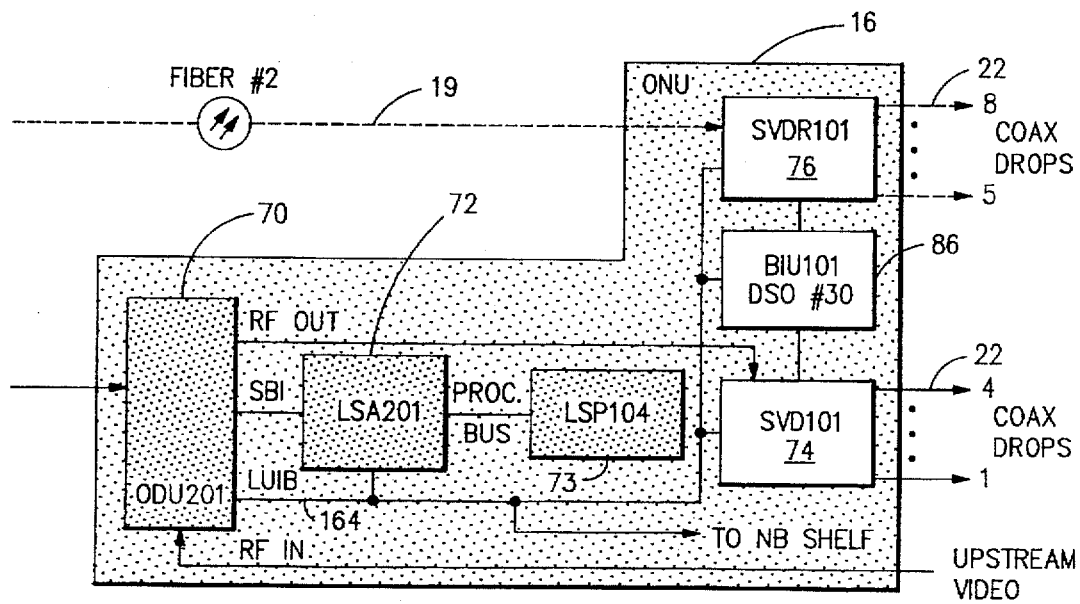
SHADED AREAS INDICATE UNITS REQUIRED FOR A NARROWBAND ONLY SYSTEM

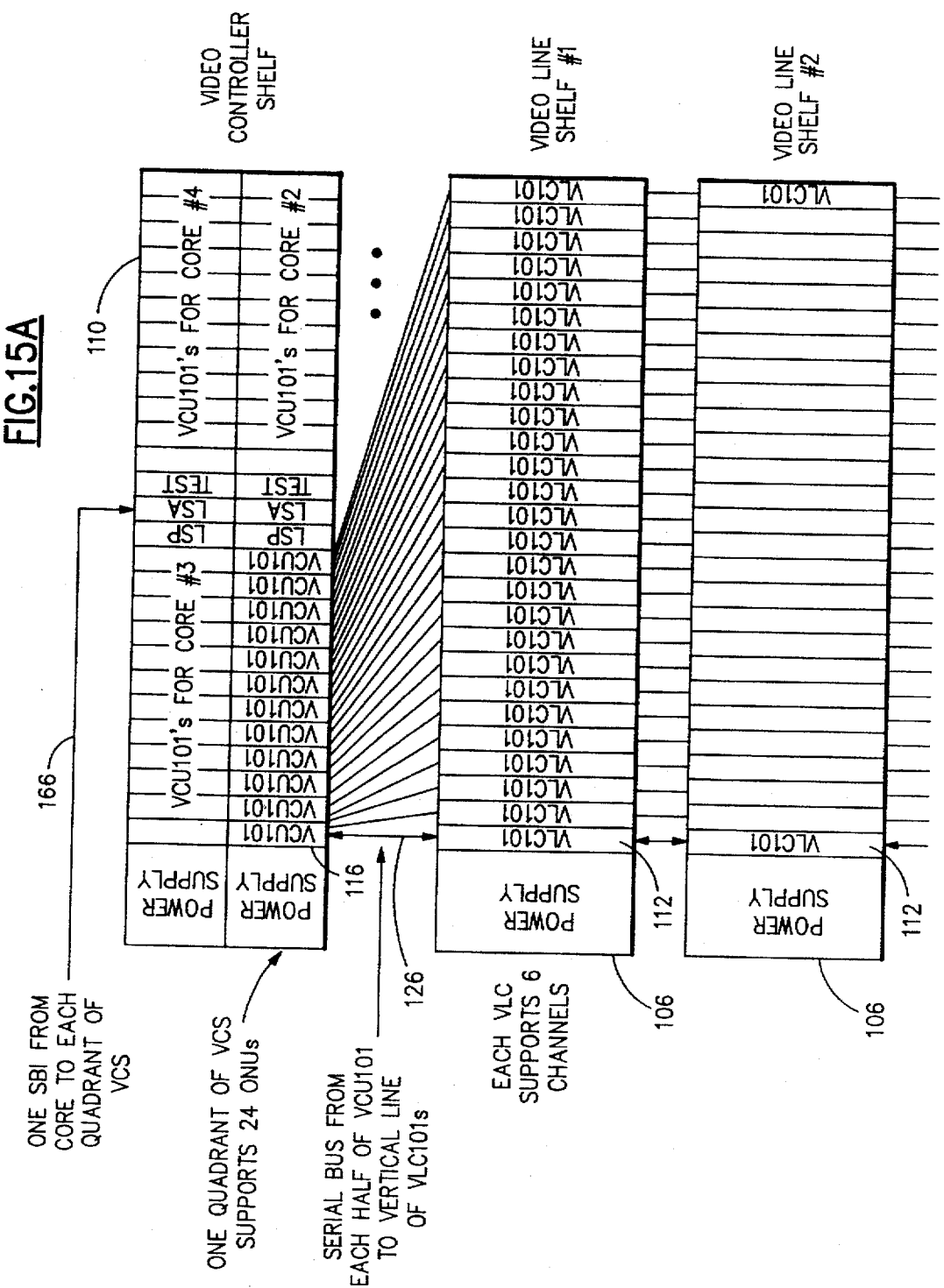

OPTICAL DISTRIBUTION SHELF FOR A REMOTE TERMINAL OF AN OPTICAL FIBER TELECOMMUNICATIONS NETWORK

CROSS-REFERENCE TO RELATED APPLICATIONS

This is a division of application Ser. No. 07/738,315 filed on Jul. 31, 1991, now U.S. Pat. No. 5,576,874.

This application describes an invention which is related to a plurality of inventions covered by the following commonly assigned and in some cases co-pending U.S. patent applications: Ser. No. 351,861 filed May 12, 1989; Ser. No. 452,291 filed Dec. 15, 1989; Ser. No. 295,887 filed Jan. 11, 1989, now U.S. Pat. No. 5,014,268, issued May 7, 1991; Ser. No. 351,458 filed May 12, 1989; Ser. No. 451,419 filed Dec. 15, 1989; Ser. No. 451,436 filed Dec. 15, 1989 now U.S. Pat. No. 4,993,019 issued Feb. 12, 1991; Ser. No. 547,383 filed Jul. 3, 1990, now U.S. Pat. No. 5,027,349 issued Jun. 25, 1991; Ser. No. 616,175 filed Nov. 20, 1990; and co-pending applications Ser. No. 07/738,111, entitled, "Switched Video Architecture for an Optical Fiber-to-the-Curb Telecommunications System"; and Ser. No. 07/739,203, entitled "Fiber Optic Link", both filed on Jul. 30, 1991. The Disclosures of the above-mentioned applications and patents are herein incorporated by reference.

BACKGROUND OF THE INVENTION

1. Field of the Invention

The present invention relates to an optical fiber telecommunications network and more particularly, to such a network that provides both narrowband telecommunications signals and broadband switched video signals. The invention provides an optical distribution shelf for use in a remote terminal for distributing optical signals to distribution fibers extending to remotely-located optical network units.

2. Description of the Prior Art

The rapid proliferation of optical fiber telecommunications systems has made possible the provision of broadband services to individual subscribers on a relatively universal basis. Such broadband services often include data transmission; however, there is a broader market for the distribution of video signals over the telecommunications network.

The provision of such video services has long been desired; however, the previously proposed systems have all been subject to various deficiencies which have prevented their commercial acceptance. Video signals may be broadcast to all subscribers over optical fibers; however, this severely limits the programming selection and the number of channels that may be available to each subscriber. A switched video architecture allows for the provision of significantly more programming options and control of distribution only to authorized subscribers.

The concept of switched video transmission systems has been proposed in the past; however, most proposals have had undesirable features. Most proposed switched video architectures require the use of a second optical fiber to distribute the broadband services or, as an alternative, the use of a wavelength division multiplexing system. Such systems do not offer a truly integrated architecture, wherein a single fiber distributes both narrowband and broadband signals and the systems are not integrated with respect to both control and cost effective utilization of common electronics.

The use of two fiber systems to distribute the broadband video service is inefficient in that the second fiber must be installed during the initial deployment of the system when there are extremely high equipment expenses. Currently, regulatory agencies do not always permit recovery of costs associated with a second fiber for broadband services. The use of wavelength division multiplexing significantly complicates a system in that it requires the use of a significant number of fiber couplers which are both high cost and large components. Both alternatives typically double the amount of costly optoelectronics required.

In unidirectional (two-channel) wavelength division multiplexing two distinctly different optical sources and detectors are utilized simultaneously. These sources and detectors must be coupled to the single transmission fiber. Separate transmitters and receivers must accompany each source and detector. This multiplicity of fibers and couplers becomes extremely difficult to handle and requires large and cumbersome equipment or delicate optical arrangements. The need for separate transmitters and receivers for each wavelength makes the cost prohibitive, particularly when universal service is rendered to all customer premises.

An article entitled: "A Future Switched Video System" by John R. Gunter, *IEEE LCS Magazine*, February, 1990, at page 66 and following, describes the desirability of providing video services over the telecommunications network. Another article entitled: "A High-Quality Switched FM Video System" by David E. Robinson and David Grubb, III, *IEEE LCS Magazine*, also published February, 1990, at page 53 and following describes a proposed system architecture wherein the various video channels are frequency multiplexed onto a carrier; however, the carrier uses wavelength division multiplexing for upstream and downstream transmissions.

Other articles describing the simultaneous transmission of narrowband and broadband signals are as follows: "A Hybrid Lightwave Transmission System for Subcarrier Multiplexed Video and Digital B-ISDN Services in the Local Loop", by Charles N. Lo, *Journal of Lightwave Technology*, Vol. 7, No. 11, November 1989, pp. 1839–1848; and "Fiber Optic Analog-Digital Hybrid Signal Transmission Employing Frequency Modulation", by K. Sato et al, *IEEE Transactions on Communications*, Vol. COM-33, No. 5, May 1985, pp. 433–441.

The upstream and downstream transmission of control information has consistently been a problem in switched video and video on demand systems. Such upstream transmission has been accomplished using wavelength division multiplexing as previously mentioned in the article of David E. Robinson et al; however, such a system is then subjected to the aforementioned deficiencies associated with the use of wavelength division multiplexing. Other systems have used a separate narrowband telephone connection for keying in control data in the upstream direction using a telephone subset. Such systems are not truly integrated and require the use of the premises telephone subset to transmit control information upstream for selection of the desired video. The RCV-1G system provided by Alcatel used a dedicated FSK subcarrier electrically multiplexed with the narrowband and video for control purposes.

Thus, the prior art has not provided a commercially acceptable architecture for mass deployment of switched video on a telecommunications network.

SUMMARY OF THE INVENTION

The present invention contemplates a truly integrated fiber optic telecommunications network providing switched video and standard narrowband telephone services. The system is integrated in that it transmits video services on the same fiber as the narrowband services and uses common equipment to support both services. Significant advantages of the present invention are realized through the use of an architecture which implements frequency division multiplexing of the narrowband telephone service and control signals with FM channels for video distribution. These frequency division multiplexed signals are summed electrically and are modulated onto an optical carrier having a wavelength of approximately 1310 nm. Of course, the system can be used with other wavelengths if practical sources are available. The use of this type of system architecture allows for the choice of a much larger number of video channels, for example 192 channels, than the previously offered services while keeping equipment cost to a minimum.

The present architecture utilizes a frequency modulated carrier instead of the prior art AM-VSB modulated carriers. An intermediate frequency of about 850 MHz is used which is higher than the 45.75 MHz used in prior art devices. Integration of broadband and narrowband signals on the same optical wavelength eliminates the need for the costly use of wavelength division multiplexing in which the broadband and narrowband signals were transmitted at different wavelengths.

The present invention utilizes a Loop Carrier Cross-connect-Fiber-To-the-Curb (LCX-FTC) System, which is an advanced SONET compliant Digital Loop Carrier (DLC) system that offers telephone companies immediate and future access to narrowband and broadband functionality. The system is designed around a family of SONET access products produced and sold by Alcatel NA Network Systems Corp., the assignee of the present invention, under product designations LCX-50 and LCX-150. The LCX-FTC system utilizes optical fibers instead of metallic lines in the local loop. The Fiber-To-The-Curb (FTC) components of the LCX-FTC system are built upon the Loop Carrier Cross-connect (LCX) hardware and software platforms of Alcatel to provide an easy migration to the FTC services. The LCX-FTC system is modular by design and can be configured to accommodate many different applications.

The above-mentioned patents and patent applications which have been cross-referenced as related inventions fully describe the members of the LCX family of access products upon which the present invention is based. Accordingly, the teachings included in these patents and patent applications are incorporated herein by reference.

In the present invention a SONET OC-1 (51.84 Mb/s) or OC-3(155.52 Mb/s) feeder provides the digital transport link from the Central Office (CO) equipment to the Remote Terminal (RT) sites. The system is adaptable for use with Universal Digital Loop Carrier arrangements or for Integrated Digital Loop Carrier arrangements. The system uses a star distribution network where the optical fibers radiate from the RT to active Optical Network Units (ONU) via point to point optical links with each residential ONU serving up to eight living units with three DS0 (64 Kb/s) channels. For residential applications two channels are typically used to provide Plain Old Telephone Service (POTS) with the third channel reserved for future applications such as the D-channel for Integrated Services Digital Network (ISDN). An ONU designed for business applications could provide more channel capacity and services per ONU than the residential ONU.

A non-blocking switch fabric is built into the RT core module to allow subscriber channels from the ONUs to be loaded and groomed over the RT to CO feeder for optimum capacity and ease of administration.

This basic architecture of an LCX-FTC system allows for easy and economical upgrades to system capabilities such as broadband video transmission which is the subject of this invention. The broadband capability is available as an upgrade to the narrowband system to yield the integrated FTC system. Utilizing an efficient and economical method for adding switched video channel capability, the LCX-FTC system provides the capability of expanding channel capacity to the ONUs as demand increases, without large upfront expenditures in CO or RT broadband equipment. Each residential ONU is capable of providing up to 48 simultaneous video channels at the rate of six channels for each of eight living units thus, future customer demands will be easily met.

The broadband service will provide for the transmission of up to 24 switched video channels over the same optical link as the narrowband channels. Two upstream, ONU-To-RT, video channels per ONU are also available. The capacity for an additional 24 video channels per ONU can also be added when needed to serve greater than four living units, by use of a second optical fiber. It is contemplated that the second fiber will be deployed along with the first fiber, but not used until needed. The broadband equipment is optional at the initial deployment of the narrowband system and can be added when required. The upgrade permits immediate deployment of switched video services, which services include basic programming, premium programming, Pay-Per-View (PPV), Impulse-Pay-Per-View (IPPV) and Video-On-Demand (VOD) from multiple service providers. The technology used allows either analog or digital television signals to be delivered to the subscriber. The switched video technology allows the subscriber to select from a range of typically up to 192 different programming channels. Using a broadcasting technique, this many program channels could not be simultaneously provided to the subscriber residents without prohibitive expense due to the required bandwidth.

The frequency spectrum reserved for the video channels from the RT to the ONU over a fiber is from 60 to 780 MHz, which supports twenty-four, 30 MHz wide, channels per ONU. At each ONU video service is available for up to four living units with six channels each reserved for each living unit. Thus, each of the four living units can subscribe to and receive one to six simultaneously switched video channels. A set-top converter, or television with built-in controller, sends program selection information upstream to the RT where video switching equipment places the selected program on the subscriber's distribution channel. A second distribution fiber to the ONU is used when video service is required by any additional living units over and above four units.

The broadband equipment uniquely uses the LCX-FTC narrowband system for control and communication. The upstream control information is transmitted over a video control channel using one DS0, in the narrowband spectrum.

In addition to the commonality of electronics, there exists commonality in the mechanical components which reduces the cost of the broadband upgrade.

The present invention is particularly directed to the provision of an Optical Distribution Shelf (ODS) that replaces up to seven metallic line shelves in a standard LCX-50 remote terminal. The ODS is connected to the 28 A and B SBIs from the LCX-50 core. The ODS decides which of the A and B SBIs is active and utilizes the narrowband telephone signals received therefrom. The ODS includes a plurality of Optical Distribution Units (ODU) connected to the SBIs and also connected to receive the switched video signals. The ODUs frequency, division multiplex the switched video signals onto the narrowband telephone signals and thereafter perform an electro-optical conversion to provide an optical output containing both broadband switched video signals and narrowband telephony signals on one optical carrier over one optical fiber. The ODS further includes a Common Shelf Alarm Unit (CSAU) and a Remote Measurement Unit Interface (RMUI), which units function as an interface to the microprocessor contained within the LCX core.

A primary objective of the present invention is to provide an ODS for use in a RT for providing a plurality of optical signal outputs to distribution fibers.

Another objective of the present invention is to provide ODUs responsive to signals from SBIs for providing narrowband telephony signals to distribution fibers.

Another objective of the present invention is to provide ODUs which function to frequency division multiplex broadband video channels with narrowband telephony signals to provide integrated broadband and narrowband signals which are modulated onto an optical carrier over a single optical fiber.

Another objective of the present invention is to provide control mechanisms for providing an interface with the microprocessor of an LCX core for controlling the ODUs.

DESCRIPTION OF THE DRAWINGS

FIG. 4 is a block diagram of an optical distribution shelf as shown in FIG. 3.

FIG. 7 is a block diagram showing how the LCX-FTC is utilized to provide broadband services.

FIG. 9 illustrates how FIGS 9A and 9B fit together.

FIGS. 9A and 9B are together a block diagram illustrating how the LCX-FTC system provides broadband services.

FIG. 15 shows how FIGS. 15A and 15B fit together.

FIGS. 15A and 15B are a block diagram illustrating the broadband video control architecture.

DETAILED DESCRIPTION OF THE PRESENT INVENTION

Figure 1:
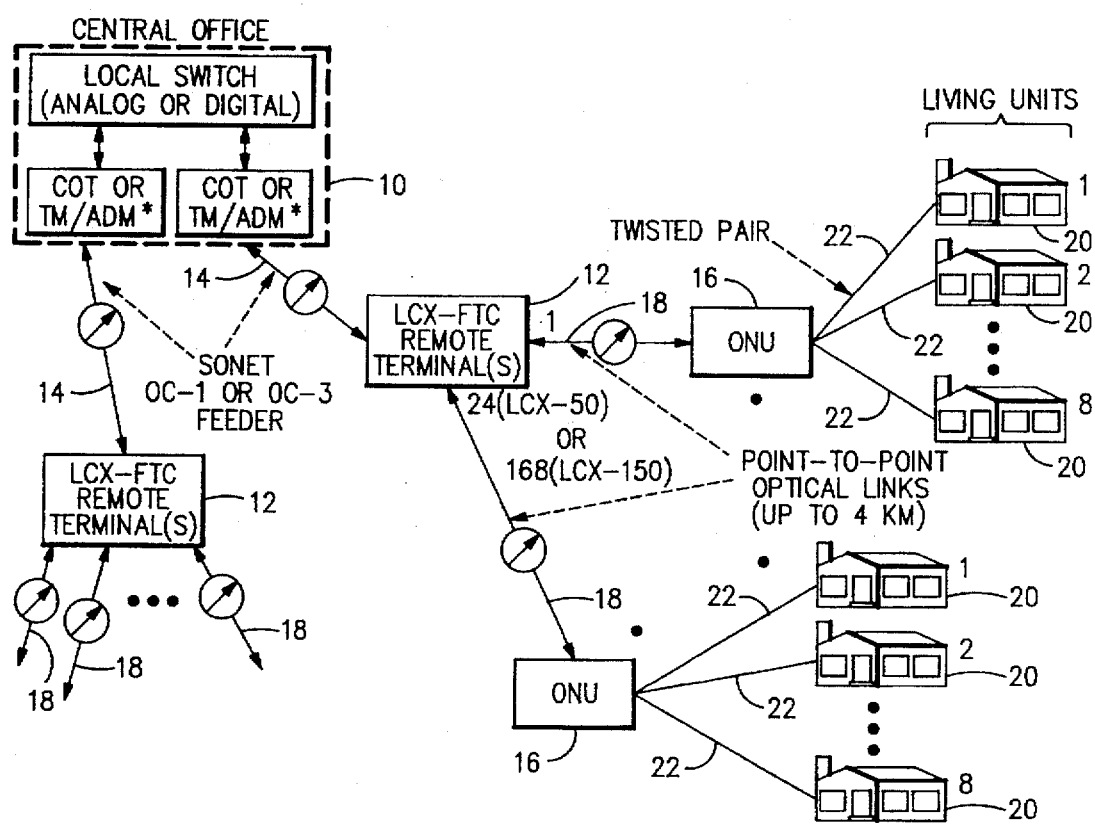
FIG. 1 is a block diagram of a basic narrowband FTC architecture which can be upgraded to provide broadband service.

Referring to FIG. 1 there is shown a CO 10 connected to remote terminals 12 via SONET OC-1 or OC-3 optical feeders 14 which function as a digital transport link therebetween. The carrier rate used for transport depends upon the current and anticipated channel capacity required. The CO 10 may include either an LCX-50 or LCX-150 Central Office Terminal (COT) for UDLC arrangements or a TM-50 or ADM-150 for IDLC arrangements. The UDLC system is suited for COs with an analog switch using metallic line shelves to provide the analog interface to the switch. The IDLC system arrangement provides a DSX-1 interface with TM-50 or ADM-150 units for COs using a digital switch. Both TR-8 and TR-303 digital interfaces are supported by the LCX-FTC system. An LCX-50 core provides the platform for OC-1 rate transmission and an LCX-150 core will provides a platform for OC-3 rate transmission. The structures necessary for the TM-50 and ADM-150 units are similar to those disclosed in the aforementioned U.S. patent application, Ser. No. 351,861 filed May 12, 1989 and the structures for LCX-50 and LCX-150 cores are disclosed in U.S. patent application, Ser. No. 452,291, filed Dec. 15, 1989.

The telecommunications system uses a star distribution network where the optical fibers radiate from the RTs 12 to active ONUs 16 via point to point optical distribution links 18. Each LCX-50 equipped RT 12 can serve up to 24 or 28 ONUs, depending on whether broadband service is being offered. The RT serves the ONUs through optical links 18. When the RT is equipped with an LCX-150, 168 ONUs can be served with narrowband and broadband services. Each ONU 16 can service up to eight living units or homes 20 and is connected thereto through the use of metallic twisted pairs or coaxial drops 22 depending on the service required in each living unit. Typically each living unit will be provided with three DS0 channels, two channels for providing (POTS) and a third channel reserved for future applications such as the D-channel for ISDN.

Figure 2:
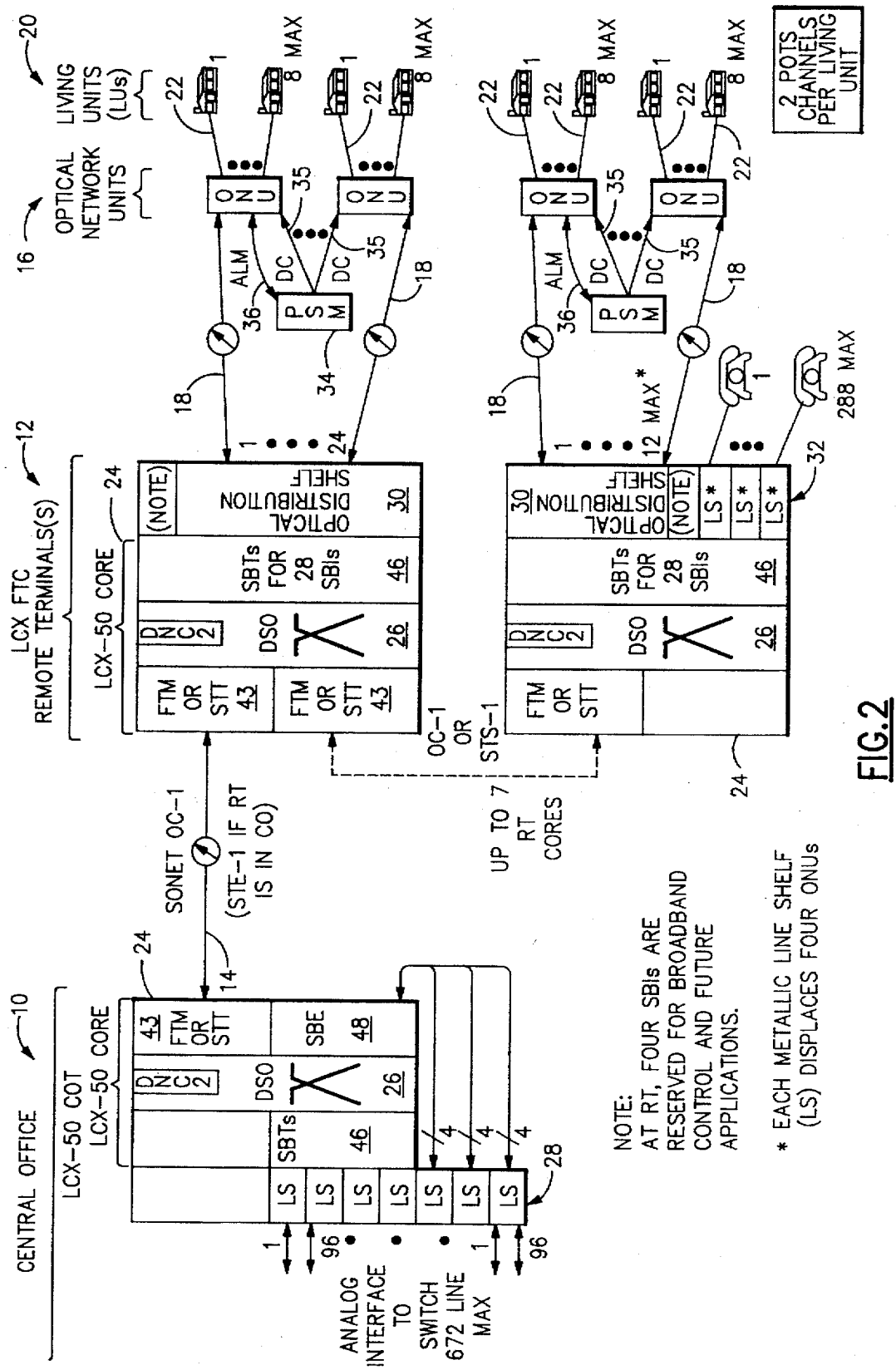
FIG. 2 is a block diagram illustrating one embodiment of the overall system of the present invention.

Referring to FIG. 2 there is shown greater detail of the LCX-50 core 24 as used in the CO 10 and RT 12. The LCX-50 core 24 utilizes a non-blocking switch fabric in the form of a time slot interchanger 26 which allows for switching of the various subscriber channels. In the RT 12 the time slot interchanger 26 allows the subscriber channels from ONUs 16 to be loaded and groomed over the RT to CO feeder 14 for optimum capacity and ease of administration. As shown in FIG. 2 several RT cores 24 can share the same feeder 14 to provide a distributed arrangement for additional flexibility and channel density. The ability of the RT to groom and reassign subscriber channels to different time slots allows more flexibility in the planning and placement of ONUs. The time slot interchanger 26 utilized in the core is constructed as shown in U.S. patent application Ser. No. 295,887 filed Jan. 11, 1989, which is incorporated herein by reference.

The configuration shown in FIG. 2 is adapted for use with a voice-grade analog switch interface and is thus a UDLC system based on a LCX-50 core. It is to be understood that a LCX-50 core can also support a system for use with an IDLC configuration and that the LCX-150 core could be used in an IDLC configuration that provides TR-303 compatibility.

The system shown in FIG. 2 includes a COT in CO 10 and a RT 12 having a plurality of cores 24 connected to the COT via a SONET OC-1 feeder 14. Optical distribution links 18 extend to the ONUs 16. Interface to the analog switch is provided by metallic line shelves 28 which accommodate channel unit plug-ins to perform the analog/digital conversions on the transmission signal and present voice frequency and baseband interfaces to the switching system. Up to seven line shelves 28 can be serviced by an LCX-50 core 24, with each line shelf providing 96 subscriber lines, for a total of 672 lines. When CO 10 is updated to a digital switch providing an integrated TR 303 interface, the LCX-FTC system can easily be upgraded to the new digital switching environment.

In the RT 12, the core 24 is connected to an Optical Distribution Shelf (ODS) 30 which provides the housing for plug-in electronics that provide the fiber optic interfaces to the ONUs. The ODS 30 is used in place of the metallic line shelves 28; however, if some metallic lines are terminated at the RT 12, a number of shelves may be equipped for metallic lines, as shown at 32. However, each metallic line shelf reduces the number of ONUs served by the ODS by four. A fully-equipped ODS has positions for 28 optical interfaces; however, only 24 are used for residential applications.

The residential ONUs 16 are sealed enclosures contemplated for use in a neighborhood right-of-way near the subscriber residence that it serves. The ONU provides electronics that perform the optical/electrical conversions required and also houses channel plug-in units that provide the narrowband interface to the living units. The narrowband channel plug-in units utilized in the ONU are substantially identical to those used in the LCX-50 metallic line shelves.

In many instances, a living unit containing customer premises equipment may be connected directly to the CO 10 without the need of a digital loop carrier system, such as the feeder link between RT 12 and CO 10. In such instances the equivalent of RT 12 would be co-located with the CO equipment. When the RT is co-located in the CO, economical electrical STS-1 connections may be used in place of the optical OC-1 feeder.

In FIG. 2, there is shown a Power Services Module (PSM) 34 associated with groups of ONUs 16. The PSM 34 is a free-standing cabinet designed to provide power to the active elements contained in the ONUs. Alarm connections 36 are also provided between the PSM and an ONU for providing alarm signals back to the RT or CO in the event of a failure in the PSM 34.

It should be noted that up to seven LCX-50 cores 24 may be connected together in one RT site, utilizing OC-1 or STS-1 interconnections. Switched video signals may be provided to the ODS 30 in each LCX-50 core 24.

Figure 3:
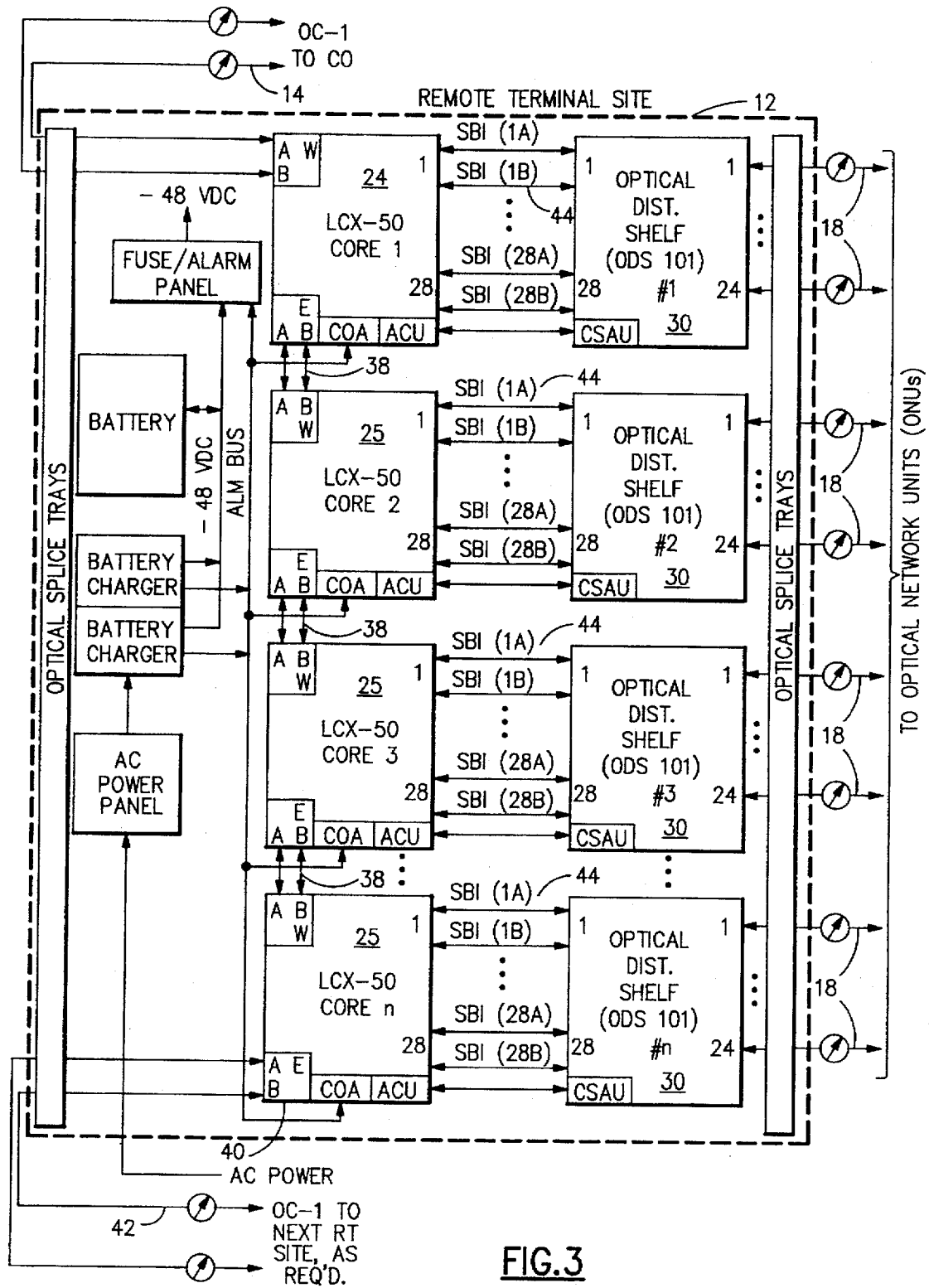
FIG. 3 is a block diagram showing a remote terminal of an LCX-FTC equipped for narrowband service.

FIG. 3 shows an arrangement wherein an OC-1 feeder 14 from the CO 10 is terminated at one LCX RT core 24, with additional LCX RT cores 25 interconnected with electrical STS-1 high-speed links 38. With this type of add-drop arrangement, the timeslots or channels in the OC-1 feeder 14 from the CO can be efficiently utilized, even when the channel capacity of all ONUs is not fully utilized. The last LCX RT core 25 in the add-drop string of cores may be equipped with an FTM-OC1 interface 40 to continue the string of cores to another RT site via another OC-1 feeder 42.

The ODS 30 is responsible for providing an interface between the LCX RT core 24 and the distribution fibers 18 to the ONUs 16. The transport and control connections between the LCX RT cores 24 and 25 and the ODS 30s are via 4 Mb/s balanced serial bus links referred to as Serial Bus Interfaces (SBI) 44. The SBI is an internal electrical bus used in the SONET access products of Alcatel and is fully described in the afore-mentioned U.S. patent application Ser. No. 351,458, filed May 12, 1989, which is incorporated herein by reference. The SBI includes a usable payload of 24 DS0 channels or one DS1 signal. The SBI is uniquely used to supply the distribution fibers 18 for the local loops. The optical signal transmitted over distribution fibers 18 is also at a 4 Mb/s serial data link, and is essentially an optical extension of the SBI.

It should be noted that the OC-1 feeder line 14 is redundant and comprises lines A and B, said redundancy is carried through the LCX-50 core and also in the SBIs 44 which are also shown as A and B SBIs. It should be further noted that in FIG. 2, there are provided fiber optic transceivers (FTM) 43, which may be replaced by STS-1 electrical transceivers (STT) if the feeder line is a limited distance electrical STS-1 line, as opposed to an optical carrier. In addition, the LCX-50 cores include Serial Bus Transceivers (SBT) 46 for interfacing with the SBIs 44. The LCX-50 core 24 located within the CO 10 also includes a Serial Bus Expansion unit (SBE) 48 to facilitate connection to additional line shelves 28.

Referring to FIG. 4, there is shown greater detail of the ODS 30 used with the cores 24 of the RT 12. The ODS 30 is used in place of a metallic line shelf and provides for the optical connection to the ONUs 16. The ODS includes, for residential purposes, 24 Optical Distribution Units (ODU 101) 50, each connected with a fiber pigtail 52 for connection to the distribution fibers 18. Each ODU 50 is connected to the LCX 50 core 24 via a pair of redundant SBIs 44. The ODU 50 essentially performs an electro-optical conversion of the electrical SBI signal to an optical SBI signal. The ODU 50 is also adapted to receive switched video signals from broadband equipment and to Frequency Division Multiplex the video signals with electrical SBI signals, which will be described hereinafter.

Each ODS 30 is further provided with a Common Shelf Alarm Unit (CSAU) 53. A Remote Measurement Unit Interface (RMUI) 54 may be provided in the ODS, only one RMUI is necessary per RT. The components of the ODS 30 are interconnected by a Low-Speed Serial Link Interface (LSSLI) 56 and receive power via a line 58. A Balanced Serial Link Interface (BSLI) 60 connects the CSAU 53 and the RMUI 54 with the LCX-50 core. A line 62 connects the RMUI 54 with the remote measuring unit and functions as a Test Access Path (TAP).

Figure 5:
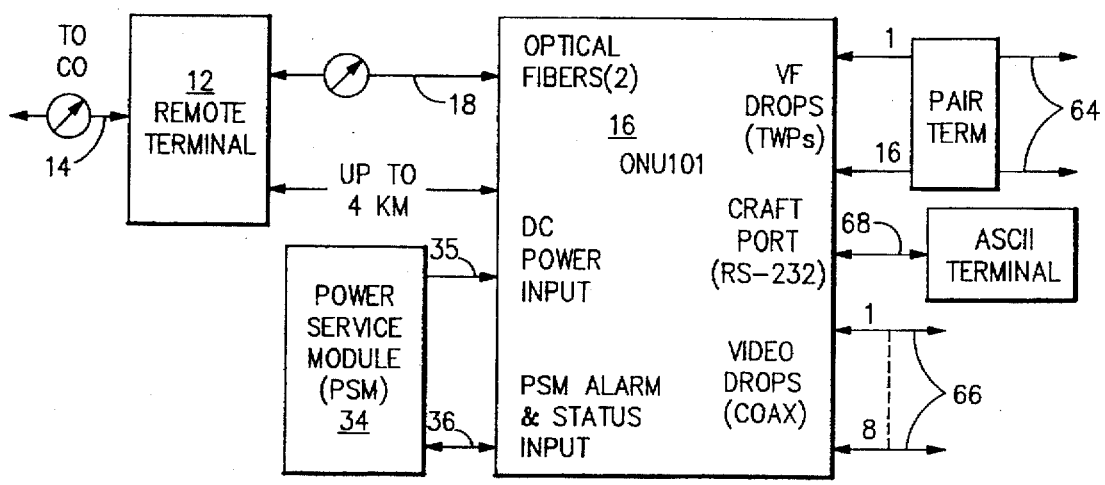
FIG. 5 is a block diagram showing how an ONU fits into the overall system.

Referring to FIG. 5, there are shown details of how an ONU 16 fits into the overall system. Two optical fibers 18, one active and one spare, are received from RT 12. The active fiber carries narrowband and broadband signals, while the spare fiber is provided to carry broadband video service to any additional living unit over four units provided with video service. The narrowband and broadband signals on the active fiber are combined at the RT using Frequency-Division Multiplexing (FDM). The narrowband data occupies the spectrum from 0–50 MHz, while the broadband signal occupies the spectrum from 60–780 MHz.

The ONU 16 can serve up to eight living units, with three DS0 channels available per living unit. For each living unit, two subscriber drops, typically used for POTS, are available, with the third DS0 channel reserved for future applications, such as the D-channel for ISDN. The POTS subscriber drops are provided at outputs 64 and are represented by 16 twisted wire pairs. The third DS0 channel output is not shown in FIG. 5.

The ONU also provides video coax cable drops 66 for subscriber access to high-quality broadband signals. It is contemplated that a business ONU will provide more channel capacity and services per ONU than the residential ONU shown in FIG. 5. The ONU 16 receives its power from the PSM 34 over line 35 at a nominal voltage of −130 VDC. Line 36 connects the power service module 34 with the ONU 16 to provide PSM alarm and status information. Line 36 is only used between the PSM 34 and one ONU, it is not needed for all ONUs. The ONU is also provided with an output 68 as a craft port for an RS-232 connection. If desired, the −130 VDC power could be provided from a local power source, such as residential power.

Figure 6:
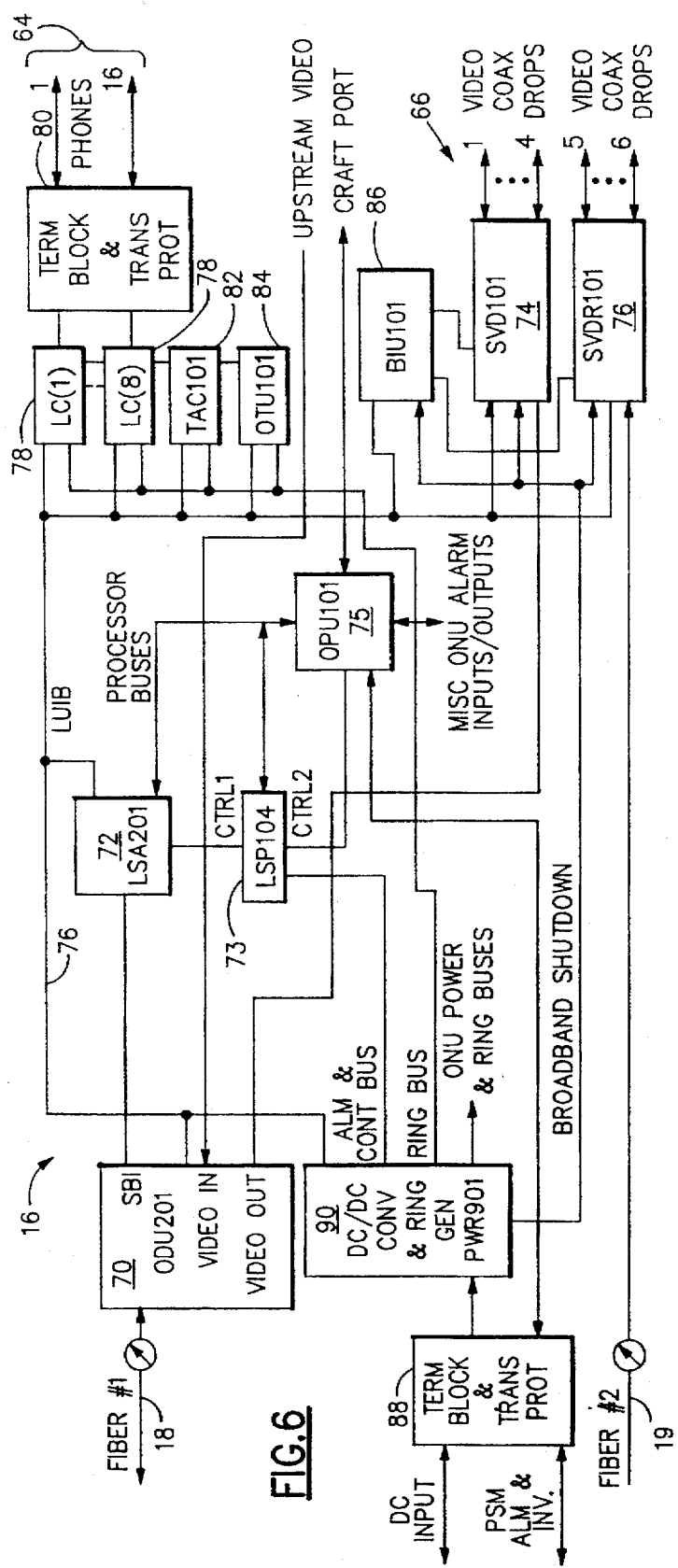
FIG. 6 is a block diagram of an ONU.

Referring to FIG. 6, there is shown a more detailed block diagram of an ONU 16. The integrated narrowband and broadband signal is received from the RT 30 over a distribution fiber 18 which is connected to an Optical Distribution Unit (ODU 201) 70. The ODU 70 converts the optical signal to an electrical signal and includes a lowpass filter which separates out the narrowband signal from the integrated signal. The narrowband signal is in the form of an encoded serial bus interface (SBI) data stream, which signal is sent to a Line Shelf Access (LSA) 72 which functions to distribute the signal to various time slots assigned to cards inserted in the ONU shelf. The broadband video is filtered from the electrical signal and then sent to a Switched Video Distribution (SVD) card 74. The SVD 74 provides video coax drops 66 to four living units 20 requiring video service. When more than four living units are to be serviced with video, a second distribution fiber 19 must be utilized and is connected to a Switched Video Distribution Receiver (SVDR) 76, which provides video coax drops 66 for four additional living units 20.

The ODU 70 has a video input for receiving upstream video from the living units 20.

Many of the components of the ONU 16 are substantially identical to the standard metallic line shelf components utilized in the Alcatel Access Products and are described in the afore-mentioned U.S. Patents and Patent Applications. The LSA 72 is described in U.S. patent application Ser. No. 452,291, filed Dec. 15, 1989, which application also describes the Line Shelf Processor (LSP) 73, said application being incorporated herein by reference. In the present invention, the LSP 73 has additional control functions due to the video distribution handled by the ONU. The LSA 72 is connected to most components of the ONU via a Line Unit Interface Bus (LUIB) 76. The LUIB is described in detail in U.S. patent application Ser. No. 451,436, filed Dec. 15, 1989 and is incorporated herein by reference.

The narrowband metallic DS0 service is provided by line cards 78 which are connected to a terminal block 80 for connection to twisted pairs 64 to be provided to the living units 20. A standard Test Access Unit (TAC) 82 is connected to an ONU Test Unit (OTU) 84 for test purposes. A Broadband Interface Unit (BIU) 86 is provided for controlling the distribution of the broadband signals. A terminal block 88 is provided to receive the DC power input and the alarm information from the PSM 34. Terminal block 88 is connected to a DC/DC converter and ring generator 90 which provides ring signals, alarm and control information.

An ONU Port Unit (OPU) 75 provides an RS-232C craft port for provisioning channel units or to logon to the RT DNC. The OPU collects local ONU alarms and provides an alarm communication interface between the PSM 34 and the CO 10.

Referring to FIG. 7, there is shown a system diagram for the provision of broadband video service. The CO 10 receives a plurality of video channels from a video headed 92 connected to the CO 10 via an optical link 94. It is contemplated that typically 192 switched video channels will be provided to remote terminal 12. Other video providers 96, such as providers of video on demand, may be connected to the CO 10 by an optical link 98. The program channels are transported to the RT 12 via FM video supertrunks 100. Such FM video supertrunks are commercially available and are in common use for other video transport applications. The video channels between the video service providers and CO, or between COs, do not necessarily have to be transported in an FM format. These links can be the standard AM-VSB or other digital formats. However, the format must be converted to FM within the LCX-FCX frequency plan prior to interfacing with the LCX-FTC RT-12 broadband equipment. FM is used for the video distribution format in the present invention, due to its noise immunity compared to the AM-VSB system, and also due to the availability of components designed for satellite distribution of video signals. The FM system is similar to common satellite signals and is therefore compatible with most HDTV formats that have been proposed, both analog and digital.

Figure 8:
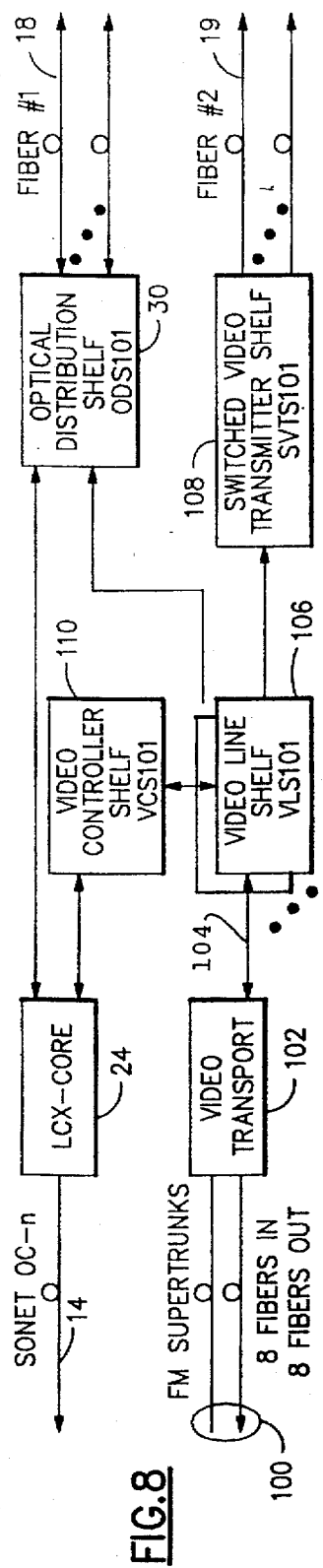
FIG. 8 is a block diagram showing the basic broadband functions of a remote terminal.

Referring to FIG. 8, there is shown a block diagram of an RT 12 illustrating the video distribution system. The broadband video transmitted between the CO 10 and the RT 12 is transmitted on eight FM supertrunks 100, each supertrunk transporting twenty-four 30 MHz-wide channels occupying a spectrum of 60–780 MHz. Thus, eight supertrunks with 24 channels each provide a total of 192 video channels for the subscribers to choose from. The eight supertrunks can be terminated at the RT or can continue to another RT. The supertrunks 100 are connected to the video transport equipment 102, which essentially comprises eight optical-to-electrical converters for converting the optical signals from the eight fibers to electrical signals, and eight electrical-to-optical converters for converting the electrical signals back to optical signals for transmission on an additional eight fibers to a next RT. The electrical video signals between the converters are tapped off and are provided to eight RF video distribution buses 104 for connection to eight Video Line Shelves (VLS) 106. Up to four VLSs 106 provide output to the ODS 30 for ONUs that are providing video service for up to four living units on a primary distribution fiber 18. For situations where an ONU is providing video service to more than four living units, additional VLS 106 are connected to a Switched Video Transmitter Shelf (SVTS) 108. The SVTS 108 provides a second fiber 19 to the ONU for providing video to additional subscribers.

A Video Controller Shelf (VCS) 110 receives control signals from the LCX core 24 for controlling Video Line Cards contained within the VLS 106. The LCX core 24 receives the control signals from the living units 20 over fiber 18 via the ONU. The control signals select the video desired by the subscriber.

FIG. 9A and 9B are a functional block diagram of the LCX-FTC broadband RT and the ONU. The RT 12 receives the broadband video on the eight FM supertrunks 100 at the video transport equipment 102, where the optical signals are converted to electrical signals and thereafter are reconverted to optical signals for transmission to the next RT or CO.

The eight electrical RF signals are provided on coax buses 104 for distribution within the RT 12. The eight video distribution buses 104 are routed to the VLSs 106. There can be 1–8 VLSs, depending upon the number of switched video channels required per ONU and the number of ONUs being served. Each VLS 106 can provide six video channels for each of 24 ONUs. As the number of video channels required per ONU increases, more VLSs can be added to provide the additional capacity. Each slot in the VLS is dedicated to a particular ONU. Thus, each VLS 106 has slots for 24 VLCs 112, with each VLC servicing a single ONU. If four subscribers serviced by an ONU require six channels of video services, there will be four VLSs providing video to the particular ONU. With a maximum configuration of eight VLSs, a total of 48 video channels can be provided to each of the 24 ONUs. Each VLS has power splitters and amplification to distribute the eight video buses to each of the 24 VLCs that it houses. Each VLC can select six channels from the eight video buses and functions to convert the selected video channels to a distribution channel frequency that is assigned to the particular subscriber. In the event that it is desierable to provide less than six channels to each subscriber, LSP 118 can control the VCU 116 so that one VLC 112 can provide channels to more than one subscriber, thereby reducing the number of VLCs required. This subscriber distribution channel is one of 24 channels in the 60–780 MHz range that is sent to the ONU over the fiber link 18. The 60–780 MHz spectrum is sub-divided into four sections, each with six channels for a bandwidth of 180 MHz, one section for each subscriber. For living units 1–4, up to 24 video channels are provided to ODU 50 from VLSs 1–4 and are carried over the same primary fiber link 18 used for the narrowband services. For living units 5–8, the second fiber link 19 is used to provide distribution of an additional 24 channels per ONU. In such a case, the SVTS 108 is used in the RT 12 to house up to 24 Switched Video Distribution Transmitter (SVDT) cards 114 for providing electrical-to-optical conversion for the combined video signals from the VLSs 5–8 needed for serving living units 5–8.

For control and ease of administration, each ONU is assigned a particular VLC slot in each of the VLSs 106. As an example, ONU #4 is assigned to the VLC installed in slot #4 of all of the VLSs. The outputs of the VLCs in slot #4 of the VLSs 1–4 are summed together and amplified and then routed to the ODU 50 in slot #4 of the ODS 30, which terminates the primary fiber link 18 from ONU #4. Likewise, the output of the VLCs in slot #4 of the VLSs 5–8 are summed together and amplified and then routed to the SVDT 114 in slot #4 of the VTS 108, which terminates the second fiber link 19 from the ONU #4.

Program selection is made by the use of an FM set-top converter 21 located at the subscriber's television set. The set-top converter may be similar in design to pre-existing converters, but must be adapted to select one of 192 program channels available at the RT video transport equipment 102. Up to six video channels are simultaneously available to the subscriber, with a set-top converter required for each channel. The set-top converter may include a variety of consumer features, including on-screen display, volume control, digital-audio and baseband video output.

Channel selection requests from the set-top converters are extracted by the SVD 74 and SVDR 76 in the ONU and are sent to the BIU 86. The BIU 86 combines the channel requests and places them onto an upstream narrowband video control channel, DS0 #30, for transport back to the RT 12. At the RT, the DS0 #30 video control channel from the ONU is sent along with the narrowband service DS0s from the ONU over an active SBI link 44 from the ODU 50 to the core 24. At the core, the video control channel DS0s from each of the 24 ODUs 50 are combined into one SBI 166 and are sent to the VCS 110.

The core 24 receives broadband network management and SONET overhead signals from an operations support unit 167. The SBI 166 is also used to send command and control information to the VCS 110 using the VI channel of the SBI, as explained in U.S. patent application Ser. No. 547,383, filed Jul. 3, 1990, now U.S. Pat. No. 5,027,349, which is incorporated herein by reference.

The VCS 110 is divided into quadrants, with each quadrant terminating an SBI from one RT core 24. The shelf houses up to 48 dual channel Video Control Units (VCUs) 116, 12 per quadrant.

The VCS 110 also contains a plurality of Line Shelf Processors (LSP) 118 connected to Line Shelf Access (LSA) units 120. The LSAs 120 are connected to the VCUs 116 by a Line Unit Interface Bus (LUIB) 170. The operation of an LUIB is described in U.S. patent application Ser. No. 451,436, filed Dec. 15, 1989, now U.S. Pat. No. 4,993,019; and the structure of an LSA 120 and an LSP 118 are described in U.S. patent application Ser. No. 452,291, filed Dec. 15, 1989. Both of the afore-mentioned applications are incorporated herein by reference.

The LSA 120 directs the video control channels to the appropriate VCUs in the VLS.

Each half of a VCU 116 is provided with a video control channel for controlling the VLCs 112 that are in the same slot position in each VLS 106. Each video control channel controls the VLCs for one slot position in each VLS serving the same RT core.

Upstream video received from living units by the ONU 16 is provided to the ODU 70 of the ONU and is transmitted to the ODU 50 over fiber 18. The upstream video is summed with upstream video from other ODUs 50 and is provided to the video network over a fiber 122.

The fiber optic link 18 between the RT and the ONU uses standard telephone communication single-mode optical fiber, and a nominal transmission wavelength of 1310 nm. The link can be up to 4 km in length, and one fiber is the primary fiber that carries both narrowband and broadband video signals. Both directions of transmission are provided on the same primary fiber at the same wavelength by use of optical separation in the ODUs of both the RT and the ONU. A second distribution fiber 19 is used when video service is required to any additional living units over the number four. The second fiber is deployed along with the primary fiber but remains unused until needed. The primary fiber 18 uses frequency-division multiplexing (FDM) to provide both narrowband and broadband capability over the same fiber and the same wavelength. The spectrum from 0–50 MHz is reserved for narrowband data, while the video signal occupies the spectrum from 60–780 MHz. The second fiber, when deployed, carries downstream video only. The video channels in the second link are also frequency modulated and occupy the same frequency range as those in the primary link.

Figure 10:
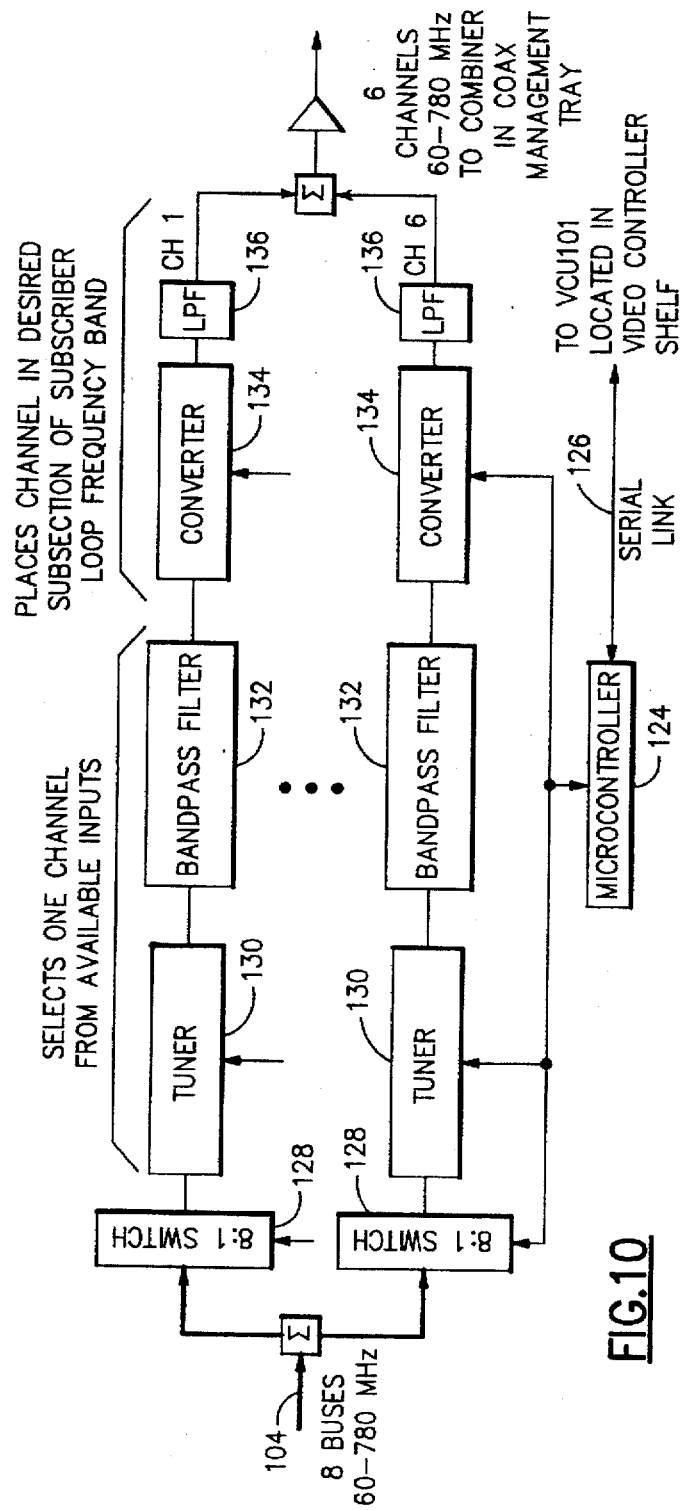
FIG. 10 shows a block diagram of a video line card as shown in FIG. 9.

Referring to FIG. 10, there is shown in greater detail the structure of a VLC 112, which contains six tuner circuits, each of which selects a requested video channel from one of the eight buses 104. The VLC converts the selected video channel to a distribution channel frequency that is assigned to a particular subscriber. This distribution channel is one of 24 channels in the 60–780 MHz range that are sent to the ONU over a fiber link 18 or 19. The 60–780 MHz spectrum is sub-divided into four sections, each six channels wide, one section for each subscriber.

The tuner circuits of the VLCs 112 are controlled by a microcontroller 124, which is connected by a serial link 126 to the VCUs 116 in the VCS 110. Each tuner circuit includes an 8:1 selection switch 128 controlled by the microcontroller 124 for connecting one of the eight buses to a tuner 130. Tuner 130 receives a local oscillator frequency controlled by the microcontroller 124 and provides an intermediate frequency signal at 850 MHz to a bandpass filter 132. The local oscillator frequency is chosen to be higher than the highest input frequency received from a bus. Thus, the tuner 130 and the bandpass filter 132 select a particular channel from the available inputs. The selected channel is thereafter converted to a distribution channel frequency, assigned to a particular subscriber, using the converter 134. Converter 134 receives a local oscillator frequency controlled by microcontroller 124 to provide an output signal in the original 60–780 MHz bandwidth. The distribution channel frequency is passed through a lowpass filter 136. The six selected channels are summed and amplified and then provided to a combiner located in a coaxial management tray 138 shown in FIG. 9. The six channels are combined with six channels from each of three additional VLSs, and the 24 channels are provided to the ODU 50.

Figure 11:
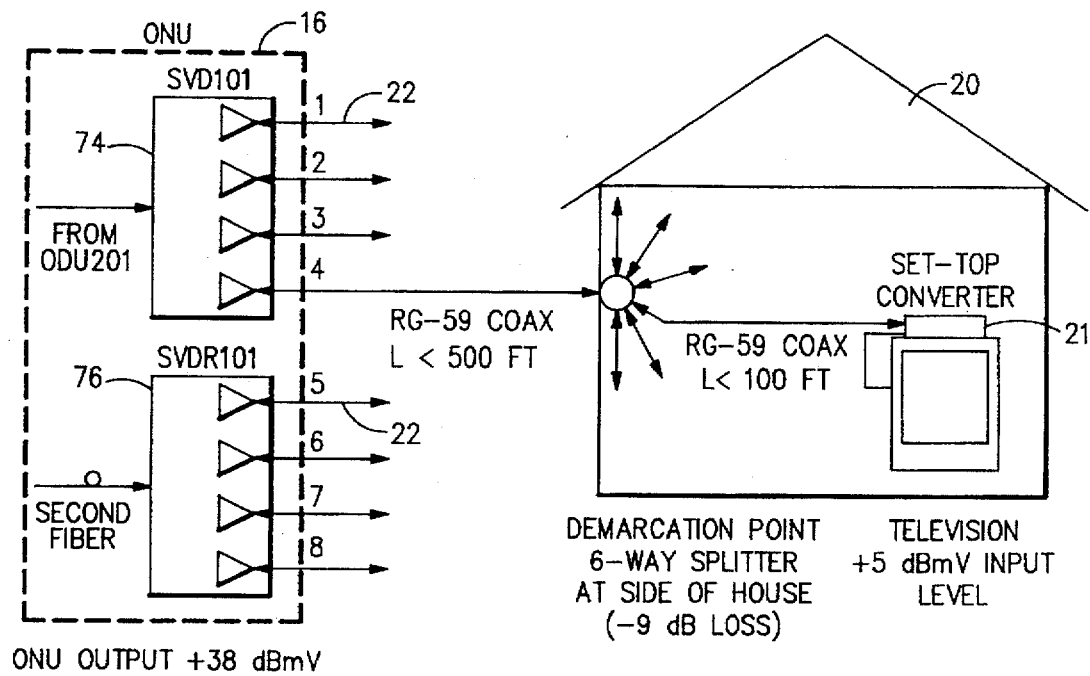
FIG. 11 is a diagram showing how broadband services are delivered to a living unit.

Referring to FIG. 11, the 24 video channels from the primary fiber 18 are demultiplexed via the ODU 70 and converted for subscribers 1–4 by the SVD 74. The optical signal from the second fiber 19 is demultiplexed and converted for subscribers 5–8 by the SVDR 76. The SVD 74 and the SVDR 76 place the subscriber's 180 MHz-wide slot into the frequency range of 330–510 MHz before being amplified and placed on the subscriber's coaxial drop 22. The 330–510 MHz range provides six 30-MHz wide slots for transporting six simultaneous video channels to the living units. The set-top converter box 21 at the subscriber's premises demodulates the selected program signal in FM format and provides an RF modulated AM-VSB or baseband video signal to the television set or video monitor.

Figure 12:
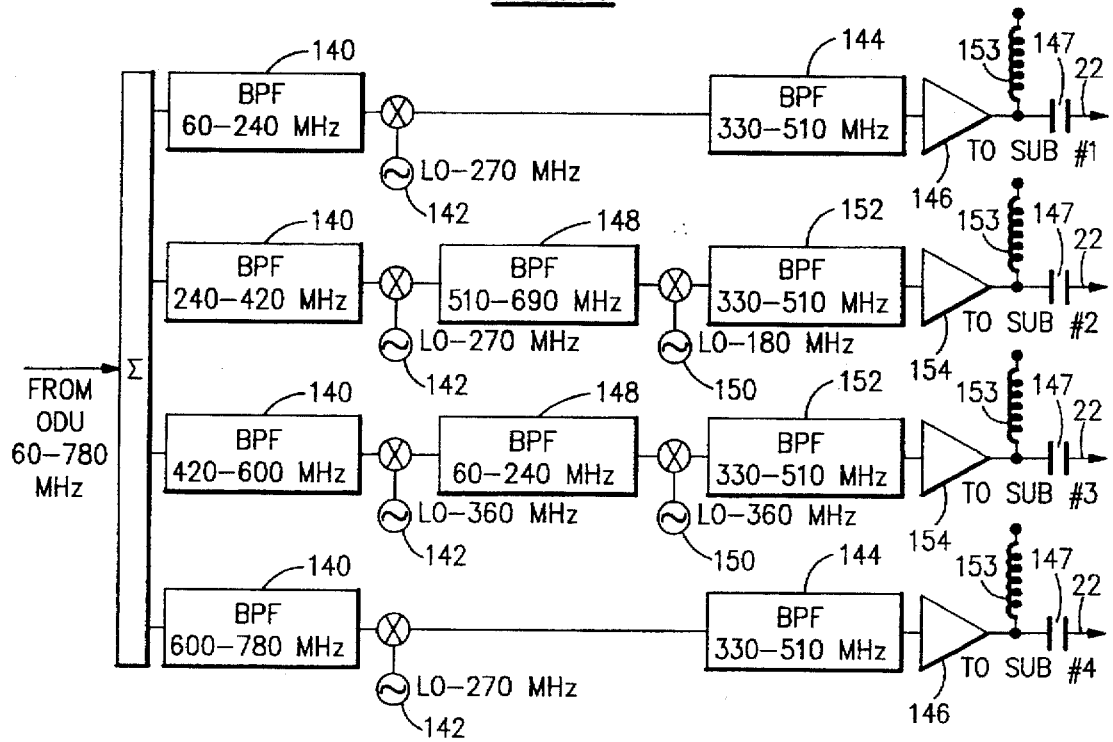
FIG. 12 is a block diagram of a switched video distribution card as shown in FIG. 9.

FIG. 12 illustrates the details of the SVD 74 and is somewhat similar to the SVDR 76. The only difference between the SVD 74 and the SVDR 76 is that SVDR 76 receives an optical signal which is converted with an optical-electro converter to an electrical signal, after which the two circuits are identical. The electrical signals from the ODU 70 in the case of the SVD 74 are provided to a plurality of bandpass filters 140 which pass selected frequency ranges applicable to the associated living unit, the passed signals are mixed with signals from local oscillators 142 to translate the signals to a frequency band that can be accepted at the living units. The signals in the uppermost and lowermost sub-bands are passed through additional bandpass filters 144 prior to being amplified in amplifiers 146. After being amplified, the signals pass through capacitors 147, which are used to block DC votage induced on coaxial drops 122 to the subscribers. The middle two sub-bands are passed through additional bandpass filters 148, after which the signals are mixed with additional local oscillator signals from local oscillators 150, with the mixed signals being passed through additional bandpass filters 152, after which they are amplified by amplifiers 154 and passed to coaxial drops 22 through capacitors 147.

RF chokes 153 are attached to the outputs of amplifiers 146 for the purpose of extracting low frequency carrier or baseband data used to control and communicate with the customer premises equipment, which mat be a set-top converter.

Figure 13:
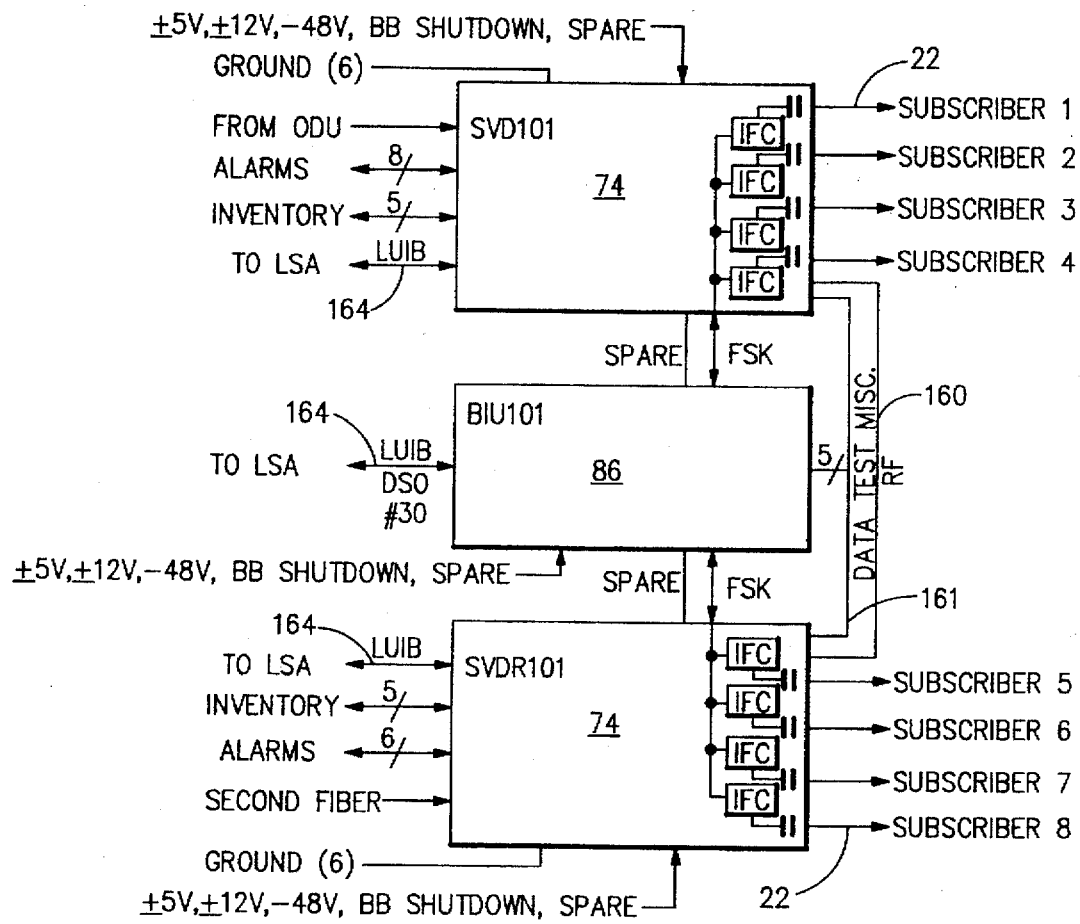
FIG. 13 is a block diagram showing the ONU broadband interfaces.

Referring to FIG. 13, there is shown the BIU 86, which receives channel selection requests from the SVD 74 and the SVDR 76 which extract the requests from the signals received over the coax drops 22 from the subscriber's set-top converters 21. A carrier frequency is used for communication to and from the set-top converters 21. A data communication network will thus be formed between the BIU 86 and all of the set-top converters 21 served from a given ONU. Frequency shift keyed (FSK) carriers are preferred. The frequency is between 5–50 MHz to pass through DC-blocked components and to prevent interference with other services, such as if the coax is used for broadcast CATV services between 50–330 MHz. A standard communications protocol for this network is used. On the SVD and SVDR the FSK carrier(s) would be extracted by a filter network (shown as an inductor and capacitor for simplicity). Collision management circuitry is required to handle contention between multiple set-top units.

The RF connection 160 between the SVDR and SVD is allocated as a provision in the event that all 24 channels of video service for four living units cannot be transmitted economically on the primary fiber in the first generation first generation of equipment. Additional channels could be transmitted to the ONU using a second fiber and the optical-to-electrical converter on an SVDR without much of the other circuitry. The recovered signal could be connected to the SVD via the RF connection to augment the channels.

Figure 14:
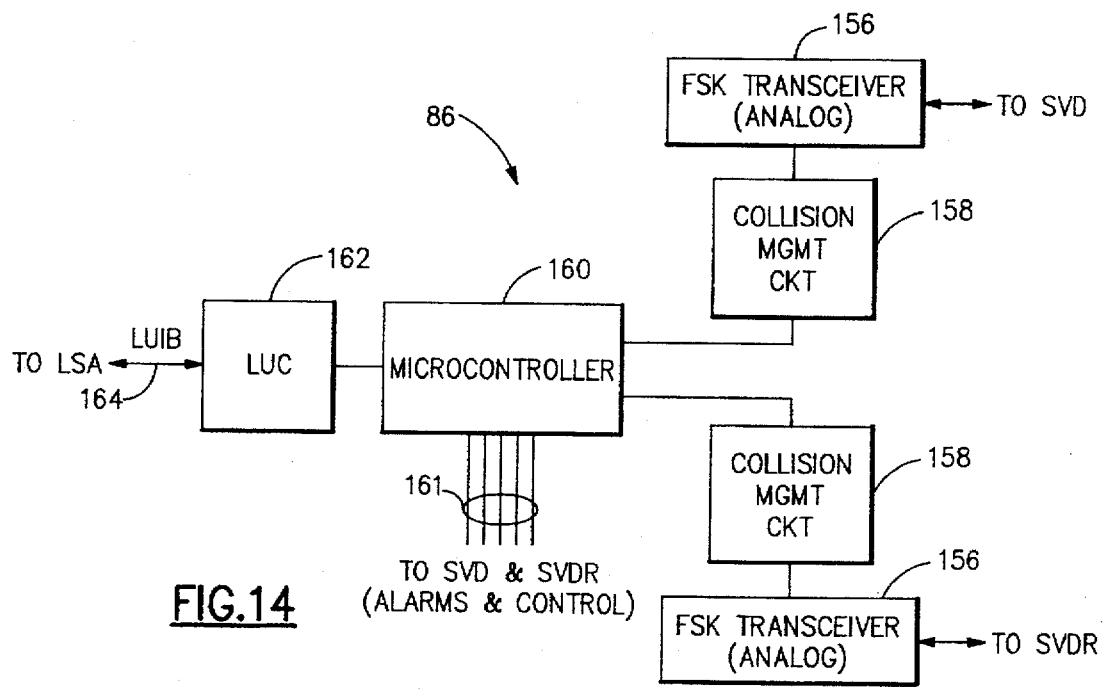
FIG. 14 is a block diagram of a broadband interface unit.

The details of the BIU 86 are shown in FIG. 14. The BIU 86 includes a pair of FSK transceivers 156, collision management circuits 158, each connected to a microcontroller 160. The microcontroller 160 is connected to SVD 74 and SVDR 76 via a bus 161 for receiving and transmitting data, tests, alarms and control information. The microcontroller 160 is connected to a line unit interface circuit 162, which is connected to a LUIB 164 for connection to LSA 72. The structure and operation of the line unit interface circuit 162 is similar to that described in U.S. patent application Ser. No. 451,436, filed Dec. 15, 1989, now U.S. Pat. No. 4,993,019, which is incorporated herein by reference. The BIU 86 combines the channel requests from each subscriber and places them in the upstream narrowband video control channel DS0 #30 for transport back to the RT 12 over link 18.

The microcontroller 160 and the transceiver circuitry translate the commands into a digital data packet for transmission to the remote terminal in a control channel (DS0) on the SBI. Note that this path is bidirectional. Channel change commands are described as the typical example. Information may also be sent to the subscriber. For example, if a channel change request is denied, that information would be transmitted to the subscriber. Other dialog with the subscribers and set-top converters (diagnostic test) will also be possible. In addition, alarms on the broadband cards (BIU, SVD and SVDR) in the ONU could be communicated over the broadband control channel.

Figure 15B:
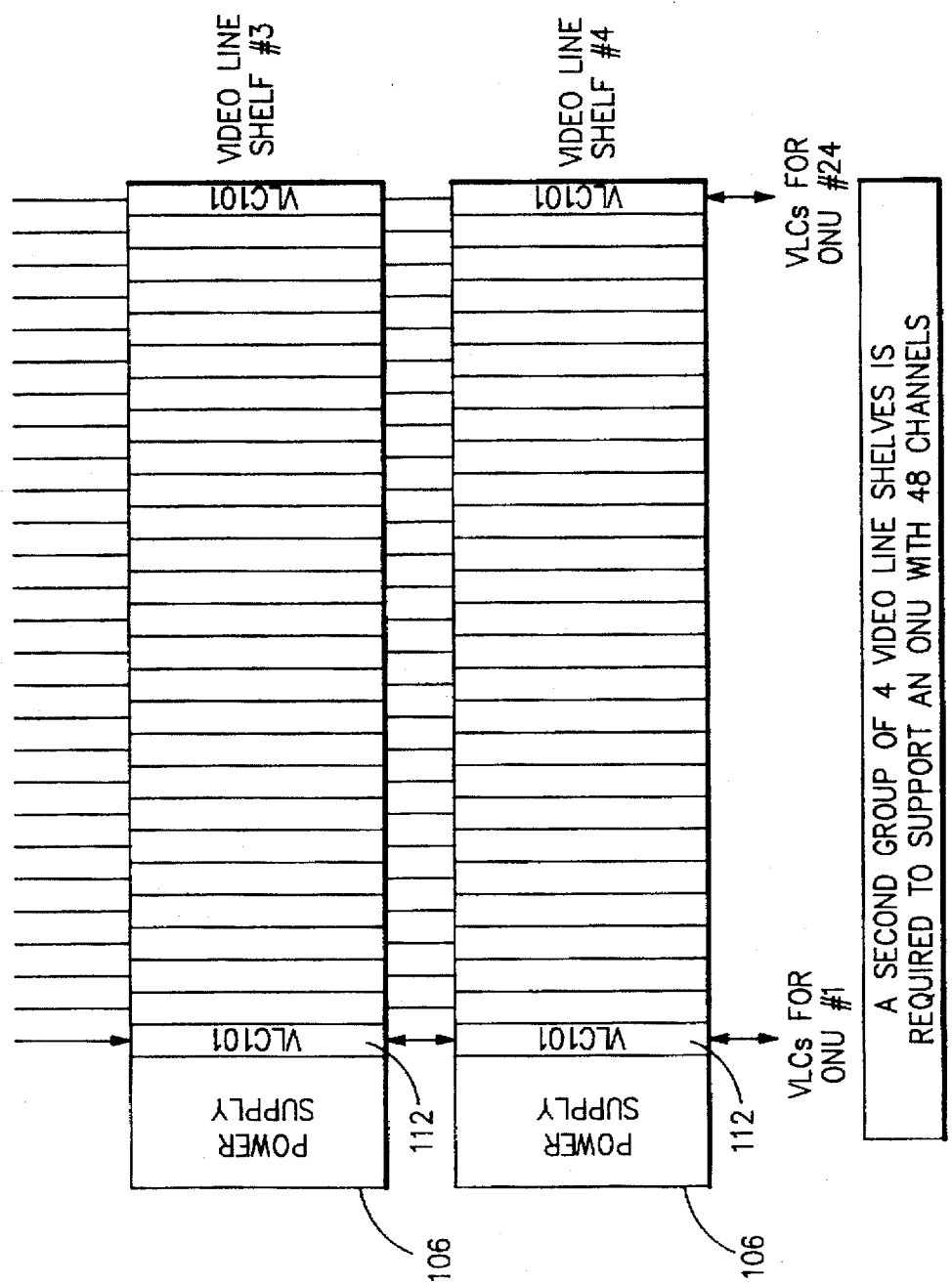

At the RT 12, the DS0 #30 video control channel from the ONU is sent along with the narrowband service DS0s over the active SBI link 44. At the RT core 24, the video control channel DS0s from each of the 24 ODUs 50 are combined into one SBI 166 and are sent to the VCS 110. The four cores 24 and 25 shown in FIG. 3 each have an SBI 166 connected to the VCS 110, as shown in FIGS. 15A and 15B. In one quadrant of the VCS 110, the 12 VCUs 116 handle the control DS0s for 24 ONUs. The serial link 126 connects the VCUs 116 to the VLCs 112 contained in the VLS 106. The VLCs in similar slots of the VLSs are connected together for control by a video control channel from a single ONU, as is illustrated in FIG. 15A and 15B.

Figure 16:
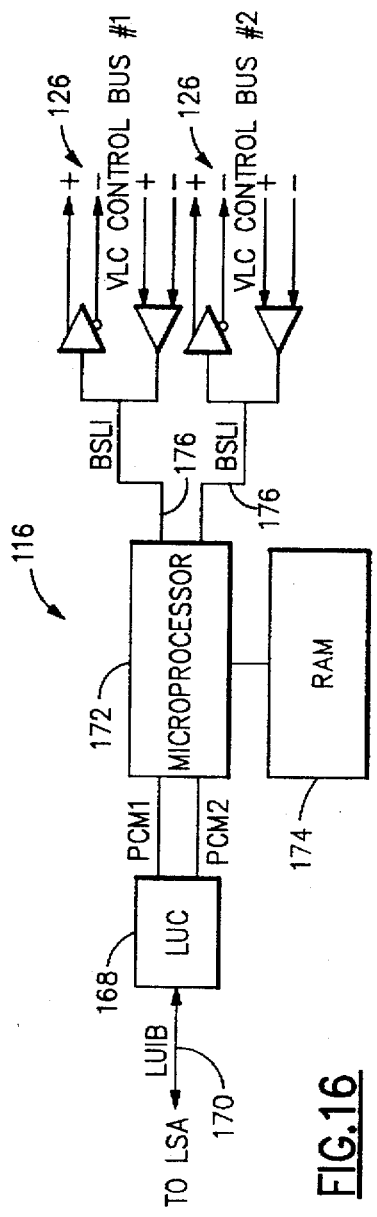
FIG. 16 is a block diagram of a video control unit.

FIG. 16 shows the circuitry of a VCU 116, which includes a line unit interface circuit 168 connected to the LUIB 170. The line unit interface circuit 168 divides out to DS0 channels for controlling the VLCs. The DS0 channels are connected to a microprocessor 172, which is further connected to RAM 174. Microprocessor 172 provides two outputs which are balanced serial links 176, which function to provide signals to the serial link 126 providing the control to the VLCs 112.

The VCUs 116 at the RT 12 convert two DS0 channels into two outputs per VCU. However, the VCU outputs are bidirectional serial buses. The VCU contains information such as channel authorization and billing data. For example, once a channel change request is received by the VCU, the unit would decide if that subscriber is authorized to tune to that particular channel. The command would then be sent along the serial link 126 to be recognized by the microprocessor in an available VLC 112 in the slot corresponding to the ONU 16 in a VLS 106. The VLC microprocessor would then command the switch, tuner and converter for an available VLC channel to select the desired channel and place in the appropriate sub-band for the subscribers.

Thus, the present invention provides a truly integrated fiber optic telecommunications network providing switched video and standard narrowband telephone services on a single optical fiber which extends to the curb adjacent the subscriber premises. Through the use of switched video, the subscriber has access to 192 video channels, with up to six channels being available simultaneously to each subscriber. Subscriber channel selection is transmitted upstream to the video switching point using a narrowband DS0 channel for transmitting the selections of a group of subscribers. This transmission is transparent to the subscriber and does not affect the POTS service provided to the subscriber.

The system allows video providers to offer a variety of different types of video service. Upstream video may also be transmitted from each ONU. The use of frequency modulation provides improved performance, and the additional use of frequency division multiplexing of the broadband and narrowband signals over the same fiber greatly reduces the cost and size of the equipment. The integration of the present system allows the broadband section to utilize the reporting alarms, status monitoring and testing, as well as remote provisioning and inventorying that are presently available in narrowband SONET systems.

What is claimed is:

1. An optical distribution shelf for a remote terminal, comprising:

a plurality of optical distribution units each including means for receiving an electrical TDM baseband signal comprising a plurality of telephony channels, means for frequency division multiplexing a frequency modulated video carrier electrical signal with said baseband signal, and means for providing an optical output corresponding to said frequency division multiplexed electrical signals; and means for interfacing said optical distribution units with a microprocessor controller in a cross-connect core controlling the source of the baseband signals wherein said cross-connect core is connected to an optical carrier level N(OC-N) optical signal.

2. An optical distribution shelf as described in claim 1, wherein the interface means comprises:

a common shelf alarm unit connected to each of said optical distribution units and to said microprocessor for collecting alarm and inventory information; and a remote measurement unit interface connected to said common shelf alarm unit, the microprocessor and to a remote measurement unit for providing a test access path (TAP) for line testing.

* * * * *